United States Patent [19]

Cutler et al.

[11] 4,232,837
[45] Nov. 11, 1980

[54] RETRACTABLE CORD REEL

[75] Inventors: Morris Cutler, Wyndmoor; Bernard J. Tamarin, Philadelphia, both of Pa.

[73] Assignee: The Vacuum Cleaner Corporation of America, Philadelphia, Pa.

[21] Appl. No.: 35,259

[22] Filed: May 2, 1979

Related U.S. Application Data

[60] Continuation of Ser. No. 835,771, Sep. 22, 1977, abandoned, which is a continuation of Ser. No. 640,540, Dec. 15, 1975, abandoned, which is a division of Ser. No. 473,885, May 28, 1974, Pat. No. 3,929,210.

[51] Int. Cl.² .................................... B65H 75/48
[52] U.S. Cl. ........................................ 242/107
[58] Field of Search ................ 242/107–107.7, 242/56.9, 193, 194; 191/12.2 R, 12.4; 185/9–14, 45; 403/361, 383

[56] References Cited
U.S. PATENT DOCUMENTS

| 815,830 | 3/1906 | Hopkins | 242/107 |
| 1,057,543 | 4/1913 | Green | 242/107 |
| 1,584,060 | 5/1926 | White | 185/45 |
| 3,003,357 | 10/1961 | Votta, Jr. | 242/107 X |
| 3,080,185 | 3/1963 | Walker | 403/383 X |
| 3,213,546 | 10/1965 | Ebbeson et al. | 242/107 X |
| 3,400,230 | 9/1968 | Becker et al. | 191/12.2 R |
| 3,436,107 | 4/1969 | Karden | 403/383 X |
| 3,489,866 | 1/1970 | Tamarin | 191/12.2 R |
| 3,542,172 | 11/1970 | Meletti | 191/12.2 R |

Primary Examiner—John M. Jillions
Attorney, Agent, or Firm—Nelson E. Kimmelman

[57] ABSTRACT

A retractable cord reel, especially for electrical cord. The cord is carried by a pair of lightweight, electrically non-conductive hub-and-flange members secured together in sheave-like configuration. A tandem spring motor provides even tensioning of the cord, both when fully unwound and when fully retracted or wound up. Electrical continuity is provided as desired for grounding of the reel frame via a mounting arbor, which also may be non-conductive in large part so long as a sufficient part of it remains conductive.

11 Claims, 6 Drawing Figures

RETRACTABLE CORD REEL

This application is a continuation of our copending application Ser. No. 835,771, filed Sept. 22, 1977, now abandoned, which, in turn, was a continuation of application Ser. No. 640,540 filed Dec. 15, 1975, now abandoned. The latter was a division of our prior application Ser. No. 473,885 which matured into U.S. Pat. No. 3,929,210 on May 28, 1974.

This invention relates to retractable cord reels such as have a spring motor therein and optionally have latching and unlatching mechanism for controlling paid-out length and retraction of the cord, especially such reels having hub-and-flange members made of synthetic resin material and upon which electrical cords are wound.

Reference is made to U.S. Pat. No. 3,813,501 for a cord reel of this general type. The cord reel of the present invention is modeled thereon but differs therefrom and is an improvement thereover in certain important respects described below. To the extent that the respective reels are alike, rather than different as described herein, the description therein is incorporated herein (by this reference) for disclosure of the features common to both. Similarly incorporated herein are the disclosures of magnetic latching and unlatching mechanisms in Tamarin U.S. Pat. Nos. 3,528,624 and 3,596,849 and of a protective and electrically insulating dust cover of Tamarin U.S. Pat. No. 3,489,866. The present invention is useful, as well, in a spring-biased cord reel lacking any latching and unlatching mechanism, such as may be called a "constant-tension" reel.

A primary object of the present invention is provision of a lightweight retractable cord reel having a tandem spring motor.

Another object of this invention is electrical grounding of the frame of such an electrical cord reel.

A further object is reduction in the electrically conductive extent of the arbor mounting of such a reel.

Other objects of this invention, together with means and methods for attaining the various objects, will be apparent from the following description and the accompanying diagrams of a preferred embodiment thereof, which is presented by way of example rather than limitation.

In general, the objects of the present invention are accomplished as follows in a retractable lightweight cord reel, especially useful for electrical cord, having a pair of electrically non-conducting hub-and-flange members secured together in sheave-like configuration. Such reel includes a main hub mounted rotatively on an arbor and spring-biased relative thereto in the direction of cord retraction or windup, and an auxiliary hub concentric with the main hub and with the arbor, a first spring coiled within the auxiliary hub with its outer end secured to the main hub and with its inner end secured to the arbor, a bushing fitting rotatively about the arbor and non-rotatively relative to the auxiliary hub, a second spring coiled within the main hub with its outer end secured to the main hub and with its inner end secured to the bushing, whereby unwinding of the chord from the reel tightens the first spring before tightening the second spring.

In such a cord reel having an electrically conductive arbor, electrical conductor rings concentric therewith, and a non-conductive flange rotatable relative to the arbor and carrying the rings rotatively therearound, this invention provides an electrically conductive collar secured to the supporting means and encircling the arbor and in contact therewith, and an electrical interconnection between the collar and a grounding conductor. A major portion of the arbor may be electrically non-conductive so long as part thereof between the collar and the reel frame establishes a path of electrical continuity therebetween.

Figure 1:
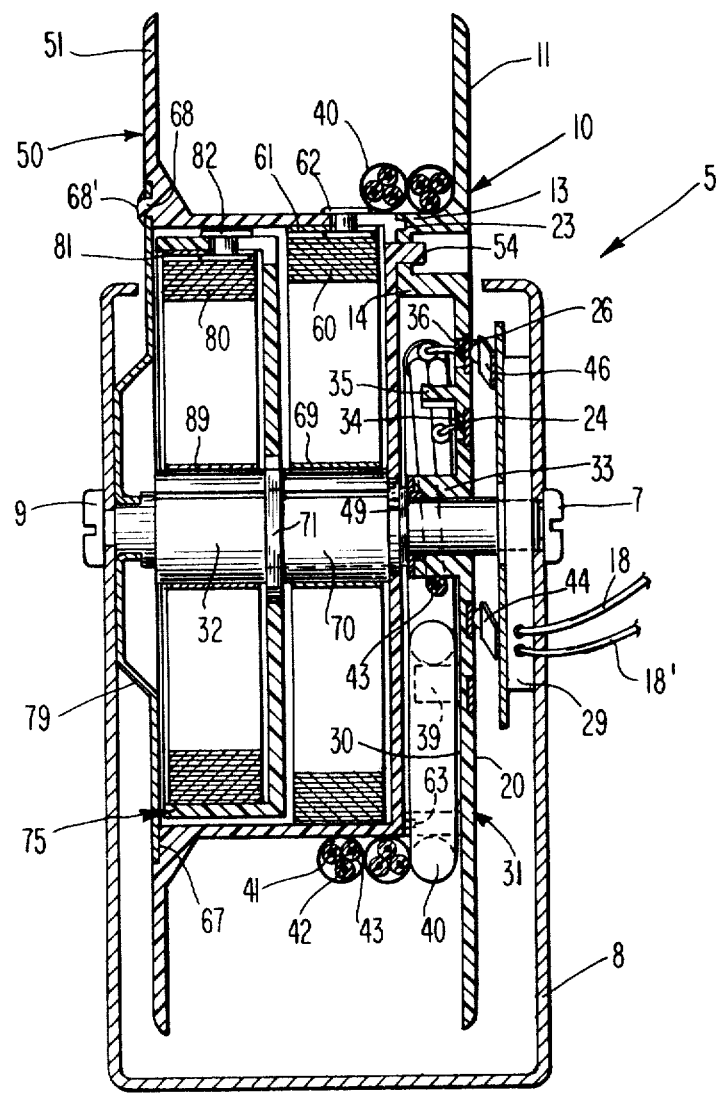
FIG. 1 is an axial section through a cord reel of this invention.

FIG. 1 shows cord reel 5 of the present invention. Prominently visible are mounting bracket 8, right hub-and-flange member 10, left or main hub-and-flange member 50, auxiliary hub member 75 inside the main member, and arbor 32 carrying the respective hub members rotatively thereon. The arbor is secured at opposite ends to bracket 8 by screws 7 and 9 and is keyed non-rotatively thereto by complementary flatting of its ends and of openings in the bracket. The bracket is illustrative of any suitable frame member and of an alternative housing completely surrounding the rotatable members. The right and left hub-and-flange members together form a sheavelike member about which is wound cord 40, here shown as a 3-conductor electrical cord having a pair of power conductors 41, 42 therein together with grounding conductor 43.

Electrical brush block 29 is mounted non-rotatively on the arbor at one end against the mounting bracket. The block carries brush contacts 44 and 46 contiguous with conductor rings 24 and 26, respectively. A dust cover between the block and the contacts extends radially beyond the contacts to protect them against intrusion of dust, oil, or other foreign matter. Electrical leads 18, 18' from the block are interconnected within the block to the respective brush contacts and terminate at their external end at a conventional electrical plug (not shown).

Right hub-and-flange member 10 has integrally formed collar portion 33, which fits rotatively around arbor 32 and aids in orienting it thereon. The end of the collar also bears against collar portion 49 of electrically conductive collar member 45, which functions to ground the bracket (or housing) for increased safety in use, as shown more clearly in the next view.

Figure 2:
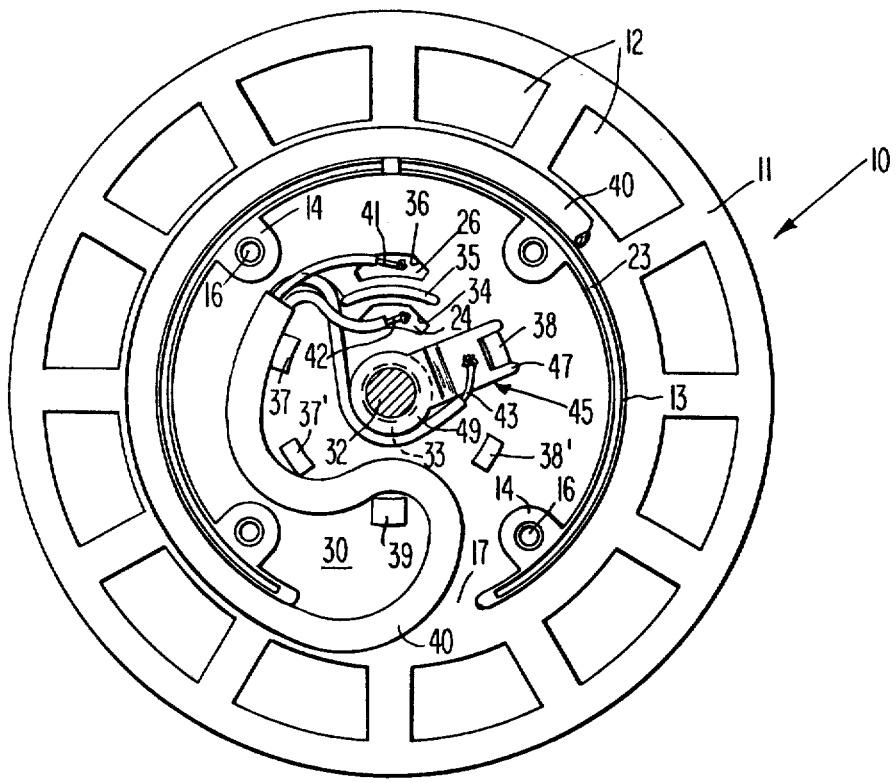
FIG. 2 is a fragmentary elevation of an internal face of a first hub-and-flange member of this invention.

FIG. 2 shows in further detail that the power conductors terminate in connections (soldered, etc.) through openings 34 and 36 in flat wall 31 of member 10, to respective conductor rings 24 and 26 carried on opposite or exterior face 20 of the wall. The grounding conductor terminates in like connection to tab 47 of conductive collar member 45, collar portion 49 of which encircles the arbor and rests against a shoulder thereon, as well as against collar portion 33 of the hub member itself. The tab portion is slotted and press-fit onto boss 38 (as shown) or adjacent boss 38'. The cord meanwhile has passed about strain-relief bosses 37, 37' and 39 similarly upstanding on the illustrated interior face 30 and passes through gap 17 in cylindrical wall 13. Thin arcuate boss 35 upstanding between the conductor terminations provides extra protection against the unlikely possibility of shorting therebetween. The roles of bosses 37, 37' and 38, 38' are interchangeable for oppositely directed cord in a reverse winding reel.

Also visible in FIG. 2 are four large equally spaced hollow bosses 14, each with a bore 16 therein to receive a complementary pin from the contiguous surface of the main hub-and-flange member. Cylindrical wall 13 has groove 23 therein for a like reason and has a boss or key midway of the arcuate extent thereof to fit in a complementary opening in that other member. Flange 11 of illustrated hub-and-flange member 10 has large openings 12 therein at equally spaced intervals to lighten the construction.

Figure 3:
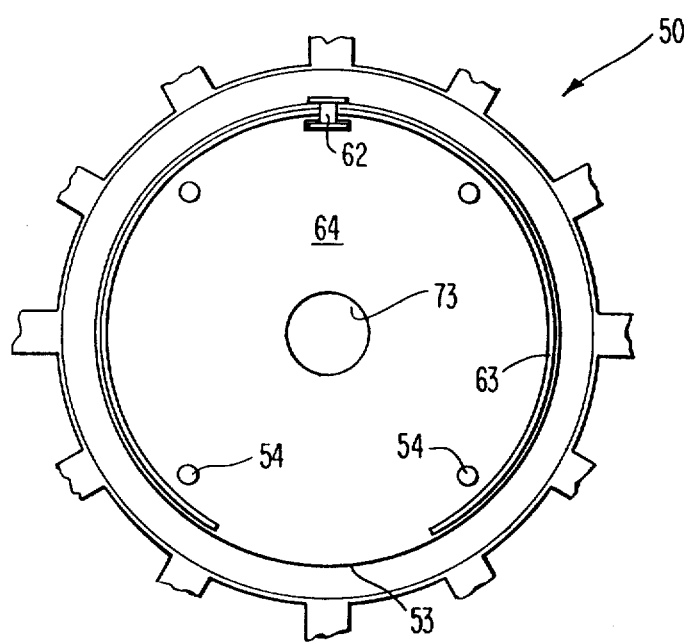
FIG. 3 is a fragmentary elevation of the inner face of a complementary main hub-and-flange member with which the member of FIG. 2 is complementary as shown in FIG. 1.

FIG. 3 shows complementary face 64 of the flat wall of main hub-and-flange member 50 with central bore 73 therein to receive the arbor. Beyond cylindrical wall 53 is included only a fragmentary showing of flange 51, which has openings 52 therein similarly to the flange of the previously illustrated member. Four equally spaced pins 54 upstanding from the face are located to fit into the bores of respective bosses 14 last shown on the previously discussed hub-and-flange member. Arcuate ridge 63 upstanding from the face just within its radial extremity is adapted to fit into groove 23 also shown in the last view. Both that ridge and cylindrical wall 53 of the hub portion in the present view are relieved by a slotlike opening into which fits double-headed rivet 62 (shown in place) as well as the key 48 of the other hub-and-flange member when assembled.

Figure 4:
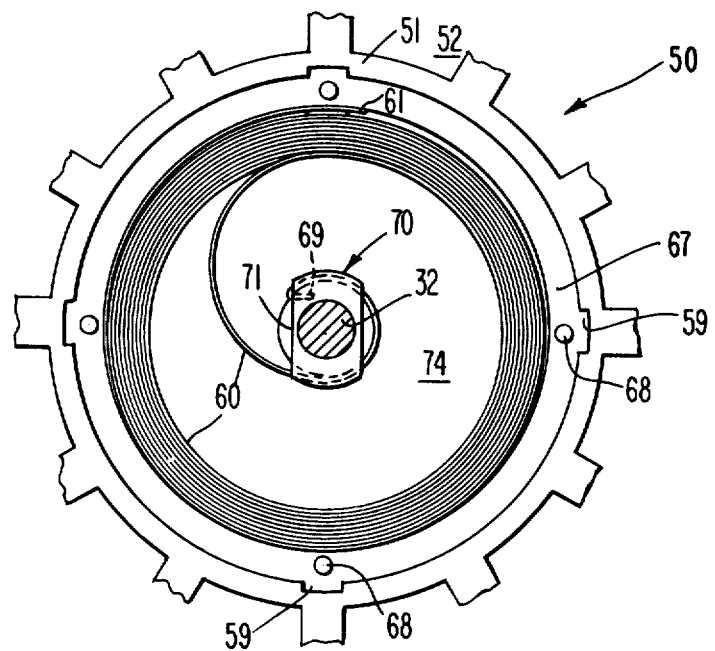
FIG. 4 is a similar elevation of the member of FIG. 3 taken in the opposite direction and with an auxiliary hub removed.

FIG. 4 shows opposite interior face 74 of main hub-and-flange member 50, the hub of which is hollowed inside and has coiled spring 60 therein. Outer end 61 of the spring has a slot therein (not shown) to engage the body of double-headed rivet 62 (shown in the last view). Inner end 69 of the spring fits into and is retained in one of a pair of appropriate slots (72—see also FIG. 6) in the cylindrical surface of bushing 70 shown encircling arbor 32 centrally located within the hub. Marginal part 67 of this face of the main hub-and-flange member is recessed slightly relative to the flange and has four equally spaced pins 68 upstanding therefrom flush with flange 51 thereof, each near an outwardly extending shallow keyway 59 in the flange portion. These pins and keyways fit with complementary parts of ratchet housing 79 shown in FIG. 1 and in the next view.

Figure 5:
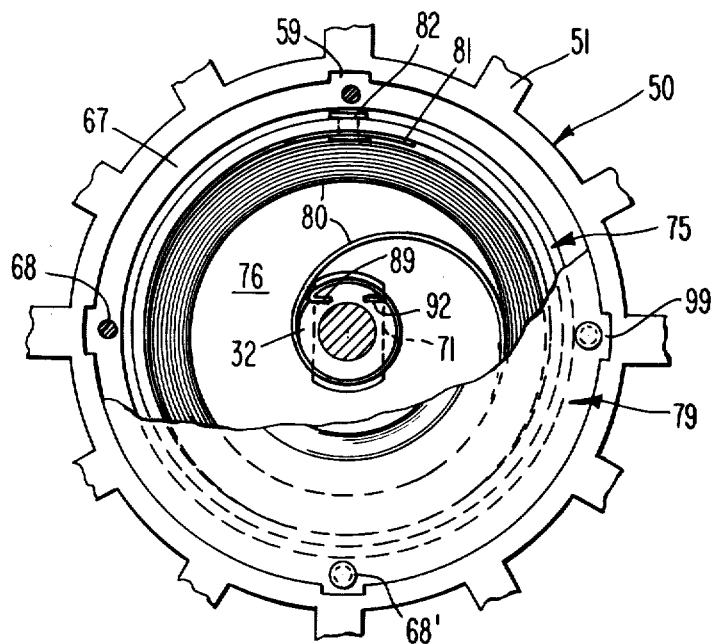
FIG. 5 is a like elevation of the member of FIG. 4 with the auxiliary hub in place.

FIG. 5 shows main hub-and-flange member 50 from the same side as in FIG. 4 but with auxiliary hub 75 in place therein and with ratchet housing 79 superimposed thereon but partly cut away for clarity of the showing. Auxiliary hub 75 has spring 80 coiled therein similarly to spring 60 in the main hub, with outer end 81 of the spring slottedly secured to double-headed rivet 82 and with inner end 89 secured in one of a pair of slots 92 obliquely cut into the cylindrical surface of arbor 32 similarly to the slotting of the bushing that retains the inner end of the other spring. Flats 71 on opposite side edges of an integral flange at one end of the bushing key it non-rotatively to a similarly configured central bore in flat wall 76 of the auxiliary hub.

Overlying ratchet housing 79 is retained in place by shallow keylike extensions 99 therefrom fitting into keyways 59, and by openings in the housing flange to receive pins 68, against recessed marginal part 67 of the main hub member. The pins are adapted to be headed over, and the headed parts (where shown) are redesignated 68' in this view. Details of latching and unlatching mechanism useful in the ratchet housing are omitted here as in FIG. 1 in view of the reference to patent disclosure thereof and inasmuch as the reel may be used in a constant-tension embodiment lacking any such ratchet mechanism.

Operation of the foregoing apparatus of this invention is readily understood. When the cord is withdrawn or unwound from the reel the main and complementary hub-and-flange member in sheave-like configuration rotate as a unit relative to the arbor, which remains stationary relative to the bracket or reel housing. The spring within the auxiliary hub tightens, as the main hub rotates, until it becomes so tight that the auxiliary hub rotates with the arbor, whereupon the spring inside the main hub proper also tightens. This tandem action avoids the undesirably high tension associated with a spring of equivalent total length while also avoiding the unduly low tension to which such a long spring is often reduced when retracted after much use. Conductive collar member is pressed into electrically conductive contact with the arbor as the combined hub-and-flange members rotate thereabout. The arbor or at least a conductive part thereof completes the circuit to the bracket or housing, with which it is in fixed contact, thereby grounding the bracket or housing via the third cord conductor soldered to the collar member.

Figure 6:
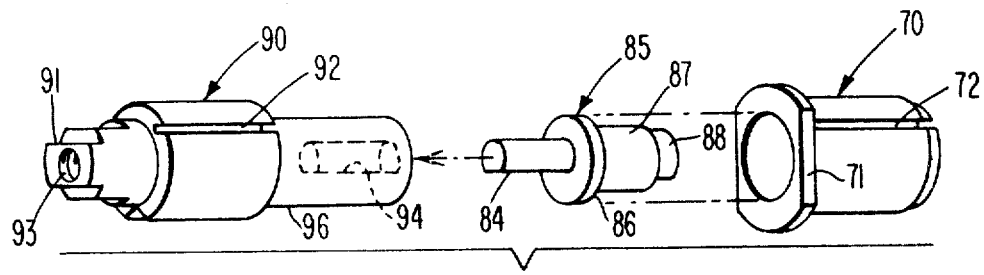
FIG. 6 is a side elevation, on an enlarged scale, of a modified arbor, with bushing for such a cord reel.

As already implied, it is unnecessary for the entire arbor to be electrically conductive, and FIG. 6 shows a composite arbor useful in the reel of this invention, together with bushing 70, which fits thereover in like manner to that previously shown with all metal arbor 32. Here left portion 90 is electrically non-conductive and may be made of any suitable material, such as a synthetic resin (e.g., nylon), while separate right portion 85 is conductive and may be all metal. The left portion is configured like the left two-thirds or so of previous arbor 32 and has oblique slots 92 (one visible) in the largest cylindrical surface thereof to retain the inner end of a spring of a spring motor for a cord reel. Leftmost end has double-flatted part 91 adapted to key to a suitable frame opening as already described and with threaded opening 93 in the end to receive one of the two end screws. Smaller cylindrical right end part 96 receives bushing 70 thereover and has flat-sided bore 94 therein to receive corresponding flat-sided post 84 of separate conductive portion 85. Right end part 88 of the latter portion is also reduced in diameter and double-flatted to key to the frame member. Intermediate cylindrical surface 87 receives the collar of the complementary hub-and-flange portion and provides shoulder 86 for conductive collar 49 to bear against. Except for its composite nature and plurality of pieces, the arbor shown in this view is configured like previous arbor 32 and performs the same functions but at a saving in metal or other electrically conductive material.

The hub-and-flange members are preferably composed of a lightweight, heat-resistant, electrically insulating synthetic resin. Polycarbonates (polyesters of bisphenol A and carbonic acid) are useful compositions for the hub-and-flange members. A suitable polycarbonate is available from General Electric Company under the brand name "Norel". A reel so composed is lighter in weight than a similar reel of the prior art composed of polystyrene but with an insert made of phenol-formaldehyde resin to secure the cord and carry the conductor rings. Polysulfones have similar characteristics and may be used instead. The respective hub-and-flange members are readily formed in a conventional molding operation and are bonded together either by solvent (e.g., trichloroethylene) action, ultrasonic welding, or dielectric heating when juxtaposed as shown. Alternatively, they may be secured together by heading over the pins (54) of one such member that fit into hollow bosses (14) of the other such member.

The cord reel of this invention provides an advantageous combination of even tension despite winding of a long cord thereon or unwinding of such a cord therefrom, provides positive grounding of the mounting bracket, reel housing or other frame member simply and without interfering with the reel action, and permits a saving of electrically conductive material. Any one or two of these features may be employed beneficially in the absence of another, while the maximum benefit is provided when all are used together.

In addition to the composite arbor last disclosed, other modifications may be made in the disclosed embodiment of the present invention, as by adding, combining, or subdividing parts, or substituting equivalents, while retaining at least some of the advantages and benefits of this invention, which itself is defined in the following claims.

The claimed invention is:

1. A retractable cord reel assembly comprising:
   (a) a main hub having a first axial aperture,
   (b) an auxiliary hub concentric with and disposed within said main hub and having a second, non-circular axial aperture coaxial with said first axial aperture,
   (c) a first spring coiled within said main hub with its inner end fastened to said main hub,
   (d) a second spring coiled within said auxiliary hub with its outer end fastened to said auxiliary hub,
   (e) a bushing having a generally cylindrical intermediate portion to which the inner end of said first spring is fastened, an inner, substantially planar end portion whose outline is congruous with the outline of said second non-circular axial aperture, and an outer end portion whose outline is substantially congruous with said first aperture, said inner end portion being disposed in said second aperture whereby said bushing rotates in unison with respect to said auxiliary hub, said outer end portion being disposed for rotary movement within said first aperture, and
   (f) an arbor which passes through said second aperture, the bore of said bushing and said first aperture, said arbor being fastened to the inner end of said second spring.

2. The assembly according to claim 1 wherein said arbor has an intermediate portion which has a diameter substantially identical to that of the bore of said bushing.

3. The assembly according to claim 1 wherein said bushing is non-conductive where it touches said arbor, and wherein said arbor has at least one portion which is conductive.

4. The assembly according to claim 1 with the addition of bracket means on which said reel is mounted, said arbor having its ends releasably attached to said bracket means so that said arbor cannot rotate with respect thereto.

5. The assembly according to claim 1 wherein said bushing has a pair of longitudinal slots formed therein opening in opposite directions into either of which said inner end of said first spring may be inserted for fastening to said bushing.

6. The assembly according to claim 1 wherein said main hub includes a first cord-retaining flange and further wherein another hub is also provided which has a second, cord-retaining flange, said hub being adapted to be mounted coaxially in juxtaposed relation to said main hub.

7. The assembly according to claim 1 wherein said arbor is integrally formed of a conductive material.

8. The assembly according to claims 5 or 7 wherein said conductive portion of said arbor is generally circular and wherein rotating contact means is disposed about said arbor and in contact with said conductive portion thereby to make continuous electrical contact with said arbor.

9. The assembly according to claim 2 wherein said arbor has a first portion adjacent said intermediate portion whose diameter is larger than the latter and also has a second portion adjacent said intermediate portion on the other side whose diameter is smaller than the latter, the diameter of the intermediate portion of the bushing being substantially identical to the diameter of the intermediate portion of said arbor.

10. The assembly according to claim 1 wherein said arbor comprises:
    (a) a first, electrically non-conductive portion which includes means for fastening the inner end of said second spring thereto, said non-conductive portion also including a substantially axial non-round passageway formed therein, and
    (b) a second portion having an elongated axial section which fits matingly and non-rotatively within said passageway, said second portion also including a coaxial section having at least one generally circular part which is conductive.

11. An arbor assembly comprising:
    (a) a first electrically non-conductive portion which includes means for fastening the end of a spring thereto, and
    (b) a second portion adapted to be juxtaposed to said first portion, said second portion having at least one generally circular part which is conductive, said first and second portions also having respective ends formed to mate non-rotatively with each other so that both portions are fixed positionally with respect to one another.

* * * * *